(12) United States Patent
Chute

(10) Patent No.: US 10,977,054 B2
(45) Date of Patent: Apr. 13, 2021

(54) METHOD AND SYSTEM FOR PROVIDING AND EXECUTING WEB APPLICATIONS WITH RUNTIME INTERPRETER

(71) Applicant: ACADIANT LIMITED, London (GB)

(72) Inventor: William Henry Chute, London (GB)

(73) Assignee: ACADIANT LIMITED, London (GB)

( * ) Notice: Subject to any disclaimer, the term of this patent is extended or adjusted under 35 U.S.C. 154(b) by 32 days.

(21) Appl. No.: 15/778,090

(22) PCT Filed: Oct. 31, 2016

(86) PCT No.: PCT/GB2016/053377
§ 371 (c)(1),
(2) Date: May 22, 2018

(87) PCT Pub. No.: WO2017/089744
PCT Pub. Date: Jun. 1, 2017

(65) Prior Publication Data
US 2018/0349149 A1     Dec. 6, 2018

(30) Foreign Application Priority Data
Nov. 23, 2015   (GB) .................................. 1520643

(51) Int. Cl.
*G06F 9/45*        (2006.01)
*G06F 9/445*      (2018.01)
*G06F 9/455*      (2018.01)
*G06F 9/4401*    (2018.01)

(52) U.S. Cl.
CPC ............ *G06F 9/445* (2013.01); *G06F 9/4401* (2013.01); *G06F 9/45529* (2013.01)

(58) Field of Classification Search
CPC ...... G06F 9/445; G06F 8/41–42; G06F 8/423; G06F 8/425
USPC .................................................. 717/136–143
See application file for complete search history.

(56) References Cited

U.S. PATENT DOCUMENTS

| | | | | |
|---|---|---|---|---|
| 6,584,612 B1* | 6/2003 | Mueller | .................. | G06F 9/445 717/118 |
| 6,970,960 B1* | 11/2005 | Sarfati | ...................... | G06F 8/60 710/106 |
| 7,240,323 B1* | 7/2007 | Desai | ........................ | G06F 8/38 707/999.101 |
| 7,293,267 B1* | 11/2007 | Fresko | ................ | G06F 9/45516 707/999.102 |

(Continued)

OTHER PUBLICATIONS

Karuss, "Genetic Improvement in Code Interpreters and Compilers", ACM, pp. 7-9 (Year: 2017).*

(Continued)

*Primary Examiner* — Anil Khatri
(74) *Attorney, Agent, or Firm* — Nixon & Vanderhye, P.C.

(57) ABSTRACT

The present disclosure relates to methods and systems for providing and executing semi-autonomous web applications within browsers. Examples of the disclosure include creating a runtime interpreter that can be executed by a browser, to allow complex, semi-autonomous and stable web applications to be constructed and deployed on user devices. The runtime interpreter is received from a first server at a browser executing on a device that receives an instruction set from a second server. The received runtime interpreter is executed within the browser and executes the received instructions set.

27 Claims, 10 Drawing Sheets

(56) References Cited

U.S. PATENT DOCUMENTS

| | | | |
|---|---|---|---|
| 7,685,577 B2* | 3/2010 | Pace | H04L 67/2823 717/136 |
| 7,694,008 B2* | 4/2010 | Chang | G06F 16/9574 709/232 |
| 7,802,238 B2* | 9/2010 | Clinton | G06F 8/51 717/136 |
| 8,136,109 B1* | 3/2012 | Birdeau | G06F 8/24 715/760 |
| 8,286,147 B2* | 10/2012 | Alpern | G06F 9/44521 717/138 |
| 8,413,047 B2* | 4/2013 | Vick | G06F 40/221 715/237 |
| 8,762,972 B2* | 6/2014 | Nikara | G06F 9/45516 717/148 |
| 8,881,303 B2* | 11/2014 | Liu | G06F 16/972 726/28 |
| 8,997,081 B1* | 3/2015 | Manion | G06F 8/41 717/168 |
| 9,110,737 B1* | 8/2015 | Tibble | G06F 8/54 |
| 9,285,977 B1* | 3/2016 | Greenberg | G06F 16/958 |
| 9,632,991 B2* | 4/2017 | Straub | G06F 40/154 |
| 9,678,928 B1* | 6/2017 | Tung | G06F 40/14 |
| 9,723,005 B1* | 8/2017 | McInerny | G06F 21/60 |
| 9,749,440 B2* | 8/2017 | Bourke | H04L 67/34 |
| 9,798,524 B1* | 10/2017 | Colton | G06F 8/31 |
| 10,268,531 B2* | 4/2019 | Kirkpatrick | G06F 9/44505 |
| 10,853,105 B2* | 12/2020 | Dowling | G06F 9/445 |

OTHER PUBLICATIONS

Zaleski et al, "YETI: a graduallY Extensible Trace Interpreter", ACM, pp. 83-93 (Year: 2007).*

Benslimane et al, "Services Mashups the New Generation of Web Applications", IEEE, pp. 13-15 (Year: 2008).*

Mesbah et al, "Crawling AJAX-Based Web Applications through Dynamic Analysis of User Interface State Changes", ACM, pp. 1-30 (Year: 2012).*

Artzi et al, " Finding Bugs in Web Applications Using Dynamic Test Generation and Explicit-State Model Checking", IEEE, pp. 474-494 (Year: 2010).*

Romer et al, The Structure and Performance of Interpreters, ACM, pp. 150-159 (Year: 1996).*

Chong et al, "Secure Web Applications via Automatic Partitioning", ACM, pp. 31-44 (Year: 2007).*

International Search Report for PCT/GB2016/053377 dated Dec. 15, 2016, 3 pages.

Written Opinion of the ISA for PCT/GB2016/053377 dated Dec. 15, 2016, 6 pages.

Anonymous: "Single-page application—Wikipedia, the free encyclopedia", Oct. 17, 2015, 8 pages.

* cited by examiner

METHOD AND SYSTEM FOR PROVIDING AND EXECUTING WEB APPLICATIONS WITH RUNTIME INTERPRETER

This application is the U.S. national phase of International Application No. PCT/GB2016/053377 filed Oct. 31, 2016 which designated the U.S. and claims priority to GB Patent Application Nos. 1520643.6 filed Nov. 23, 2015, the entire contents of each of which are hereby incorporated by reference.

FIELD OF INVENTION

The present invention is in the field of web applications. More particularly, but not exclusively, the present invention relates to a method and system for providing and executing semi-autonomous web applications within browsers.

BACKGROUND

There have been many models for software distribution. Familiar methods have included physical distribution on paper tape, magnetic tape, and optical media such as CDs and DVDs. There are also distribution methods which operate on-demand, usually via the Internet.

There are trade-offs to each method, and factors to optimise, for example:
  Cost of distribution: physical preparation and transport of media or cost of Internet bandwidth;
  Time to availability: physical delivery or Internet latency; and,
  Required sophistication of the user: knowledge of how to load packaged software or how to update software via the Internet.
  Current techniques centre around the means and methods of Internet distribution.

One of these is the App Store model. Some clearinghouses (e.g. ITUNES or GOOGLE PLAY) maintain a curated list of available software for download. ITUNES apps are all written in either the Objective-C language or the SWIFT language. GOOGLE PLAY apps are all written in the Java language. These "native" apps then run on their respective target, or client, devices. Separate code bases must be maintained for each family of devices, and yet other code bases for other targets, or clients, including WINDOWS PCs, MACINTOSH OS X PCs, and LINUX PCs.

More interesting is the universal distribution made possible by the World Wide Web.

In the case of the World Wide Web, the simplest methods involve sending markup (formatting) instructions from a server to a browser. There is a well-defined communications protocol: Hyper-Text Transfer Protocol (HTTP) and a well-understood markup language: Hyper-Text Markup Language (HTML). These are mature technologies and are codified by independent international bodies in an effort to make them universally available and useful. In this standard model, the browser's only job is to interpret the stream of HTML commands into visuals on the screen, and to allow input to be sent back to the server, also in HTML via HTTP.

In this basic model, nearly every set of interactions, and all navigation from page to page, requires one or several round-trip communications between the browser and the server, which creates latency, or delay, which is perceived by the user as slow responsiveness.

Early in the evolution of web browsers, NETSCAPE posited that it would be useful to give the browser some capability for autonomous behaviour. The first examples of this behaviour were visual effects, such as a scrolling marquee sign. More useful functions included the ability to check the completeness or validity of data entry fields and provide local guidance before wasting a round-trip sending incomplete or invalid data to the server. This was the genesis of JAVASCRIPT, a language supported by NETSCAPE, which has now matured and is universally supported, with varying dialects, by all modern browsers. JAVASCRIPT is capable of directly manipulating the Document Object Model (DOM) which is the browser's way of storing the state of the displayed web page. JAVASCRIPT is often referred to as JS.

Subsequently, Håkon Wium Lie at CERN noted that formatting information (e.g. font size, colour, margins, etc.) could be specified through the use of hints aimed directly at the browser. The browser could take the markup information in HTML and combine it with these hints to render the finished visuals in a more sophisticated manner. These hints were collected in Cascading Style Sheets (CSS), and that is now another universally applicable specification supported by all modern browsers.

As the sophistication and complexity of data gathered by and delivered to browsers increased, there were several competing standards for a loosely specified data format to group, clarify and validate this data. XML (X for "generic" Markup Language), a related generalisation of HTML is one. JSON JAVASCRIPT Object Notation (JSON), based on the notation of "hashes" or key:value pairs in JAVASCRIPT (JS), is another. For many reasons, including its ease of composition and parsing, for most applications, JSON has become most widely used, though XML is still applied where strict validation is required.

Modern JS includes a number of standard, universally supported means of storing bits of data in the browser. These include localStorage and sessionStorage, which are similar means of storing key:value pairs of data in the browser, and this data is saved by the browser on the local disk for persistent availability. There are further complementary, competing standards with support that is less universal, such as WebSQL (for which governing body work has ceased, and it is therefore a deprecated capability) and IndexedDB (potentially the eventual universal standard, but not yet universally supported). WebSQL provides a Structured Query Language-based method of storing and retrieving information on the local disk. IndexedDB is another key:value store on the local disk.

More recently, the standards bodies have settled on an agreed specification of a means for instructing a browser to cache, or store locally, some collection of HTML, CSS, JS, and supporting assets (e.g. graphics files: PNG, JPG, SVG, etc.) This capability is called the applicationCache, and the specification is called the application manifest. The application manifest tells the browser which resources to keep in its cache, and when the content of the manifest changes, tells the browser to reload all the cached resources from its server sources. This makes possible simple "single page web apps" where the page description is downloaded in HTML and cached in the browser for repeated access.

This combination of HTMUJS/CSS/JSON/localStorage/applicationCache has provided fertile ground for experimentation.

There are many JS "frameworks" now available to increase the degree of sophistication, and/or to reduce the latency of interaction, and/or allow for some activity to take place in the browser when an Internet connection is temporarily unavailable.

Examples are numerous, and include, but are not limited to:
1. Angular.js, which makes use of "templates" which are more Java-style programming objects including classes, constructors, and HTML views. These templates are "compiled" into the web app's JAVASCRIPT (JS) and HTML code. This is an example of a JS library or "framework" loaded as part of the site.
2. Bootstrap.js, which is a library of pre-configured components that enhance front-end development. The Bootstrap.js library includes JS and Cascading Style Sheets (CSS) which make it easier for developers to lay out a grid of components on a screen. While this grid allows some measure of "responsive" design, it does not allow dynamic re-sizing or intelligent selection of components at runtime.
3. RUBY ON RAILS, which runs entirely in the "cloud". Business logic is contained entirely on the server side.
4. JQUERY, which is a library which supplements the standard syntax of JS and provides a bit of abstraction. Browsers from different manufacturers may support subtly differently subsets of JSt, and JQUERY was developed to make cross-browser development easier. It is a library for use by developers.
5. COFFEE SCRIPT and TYPE SCRIPT, which are extension languages which "compile into" JS. They provide language extensions (variable types, simplified syntax, etc.) and are merely tools for developers.
6. METEOR, which is a collection of open-source tools that deliver bespoke JS web apps to the client and handle the communications between the client device and cloud.
7. REACT, which is "a JS library for building user interfaces". It provides a parallel Document Object Model (DOM) so that rendering can take place on the server.

With all of these, there is an assumption that the server will send a "page" to the browser, which is then rendered with enhanced interactions. Links from page to page require communication with the server, and the "state" is stored on the server.

There is a desire for a web application deployment system which provides for more complete client-side execution bringing greater responsiveness, similar to that of native apps. It would also be desirable if the development process for web applications could be made simpler for use by less specialist developers.

It is an object of the present invention to provide a method and system for providing and executing web applications which overcome the disadvantages of the prior art, or at least to provide a useful alternative.

SUMMARY OF INVENTION

According to a first aspect of the invention, there is provided a method for executing instructions within a browser on a device, including:
Receiving a runtime interpreter at a browser executing on the device;
Receiving one of a plurality of instruction sets at the device;
Executing the runtime interpreter within the browser; and,
The runtime interpreter executing the received instruction set.

The runtime interpreter may be, at least in part, defined within JavaScript. The runtime interpreter may be, at least in part, defined within Cascading Style Sheet (CSS) format.

The method may further include the step of receiving a boot-strap web page at the browser. The boot-strap web page may include reference to the runtime interpreter file.

The method may further include the steps of storing the runtime interpreter within an application cache at the browser and retrieving the runtime interpreter from the application cache.

The runtime interpreter may execute the received instruction set in accordance with device-specific modifications.

Each instruction set may be comprised of a plurality of objects. Each object may comprise a directive and set of supporting data. At least some of the objects may define modification to the document object model displayed by the browser. Each object may define a target state. The plurality of objects may define a hierarchical relationship between them.

The received instruction set may define one or more external requests. Each request may include a domain and an action. Each request may be delivered to a web server. The web server may orchestrate fulfillment of the request. Each request may include a data payload.

The runtime interpreter may be configured to execute on a plurality of device types.

The runtime interpreter may be configured to execute within a plurality of environment types.

The instruction set may be defined within a structured format. The structured format is subject or domain-based. The structured format may be comprised of attribute-value pairs. The structured format may be JSON.

According to a further aspect of the invention, there is provided a system for deploying semi-autonomous web applications, including:
A first web server configured to deliver a runtime interpreter to a browser executing on a user device;
A second web server configured to deliver one of a plurality of instruction sets to a browser executing on a user device; and,
A plurality of user devices, each device configured to:
Receive a runtime interpreter within a browser executing on the device
Receive an instruction set
Execute the runtime interpreter within the browser, and to
Execute the instruction set within the executing runtime interpreter.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides a method and system for providing and executing web applications.

The inventor has discovered that, by creating a runtime interpreter that can be executed by a browser, complex, semi-autonomous and stable web applications can be constructed and deployed.

At present web applications are constructed using frameworks and libraries which aid the skilled developer but do not necessarily provide for stable web applications on user devices in unreliable communication environments. By providing a runtime interpreter, communications can be managed more effectively at the client side to provide a smoother, more stable experience to the user.

Figure 1:
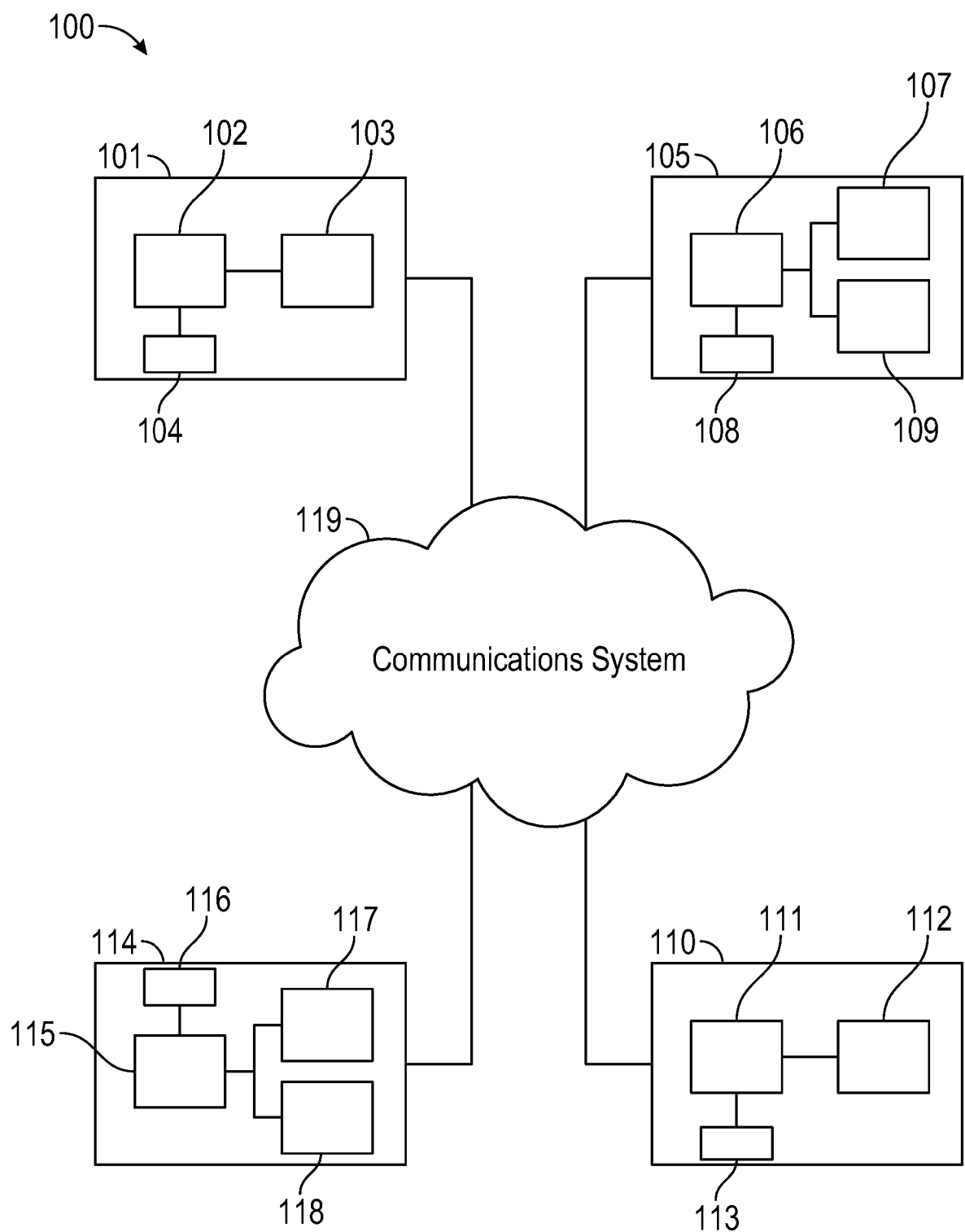
FIG. 1: shows a block diagram illustrating a system in accordance with an embodiment of the invention.

In FIG. 1, a system 100 for deploying web applications in accordance with an embodiment of the invention is shown.

The system 100 includes a first web server 101. The web server 101 may include a processor 102, a memory 103, and a communications module 104.

The system 100 may also include a second web server 105. The second web server may include a processor 106, a memory 107, a communications module 108, and a database 109.

The system 100 may also include a third web server 110. The third web server 110 may include a processor 111, a memory 112, and a communications module 113.

It will be appreciated by those skilled in the field that any or all of the first 101, second 105 and third 110 web servers may be the same apparatus.

The system 100 may also one or more user devices 114. Each user device 114 may include a processor 115, a memory 116, one or more outputs 117 and one or more inputs 118. The one or more outputs 117 may include a display, and/or an audio output. The one or more inputs 118 may include a touch/near-touch interface, a keyboard, or a pointer device.

The user device 114 is configured to execute a web browser. Examples of common web browsers include Google™ Chrome™, Microsoft™ Internet Explorer™, Apple™ Safari™, and Mozilla™ Firefox™.

The user devices 114 and the three web servers 101, 105, and 110 may be configured to communicate via a communications system 119 such as the Internet, a local area network (LAN), a wide area network (WAN), a cellular system or any combination of the aforementioned.

The first web browser 101 may be configured to deliver a runtime interpreter to the user device 114. The runtime interpreter may be defined within a web browser scripting language such as JS or ActionScript.

The second web browser 105 may be configured to store within the database 109 a plurality of instruction sets. Each instruction set may define instructions for a web application.

The second web browser 105 may be configured to deliver one of the plurality of instruction sets to the user device 114.

The runtime interpreter, when executed within the browser of the user device 114, may be configured to execute any of the plurality of instruction sets. Furthermore, the runtime interpreter may be configured to execute on a plurality of device types and within a plurality of environments.

During execution of an instruction set, the runtime interpreter may issue requests to the third web server 110. The requests may relate to a request to perform a service (e.g. retrieve data, store data, process data, etc.)

The third web server 110 may be configured to orchestrate fulfillment of requests from the runtime interpreter. Fulfilment may occur via one or more View servers (not shown).

Figure 2:
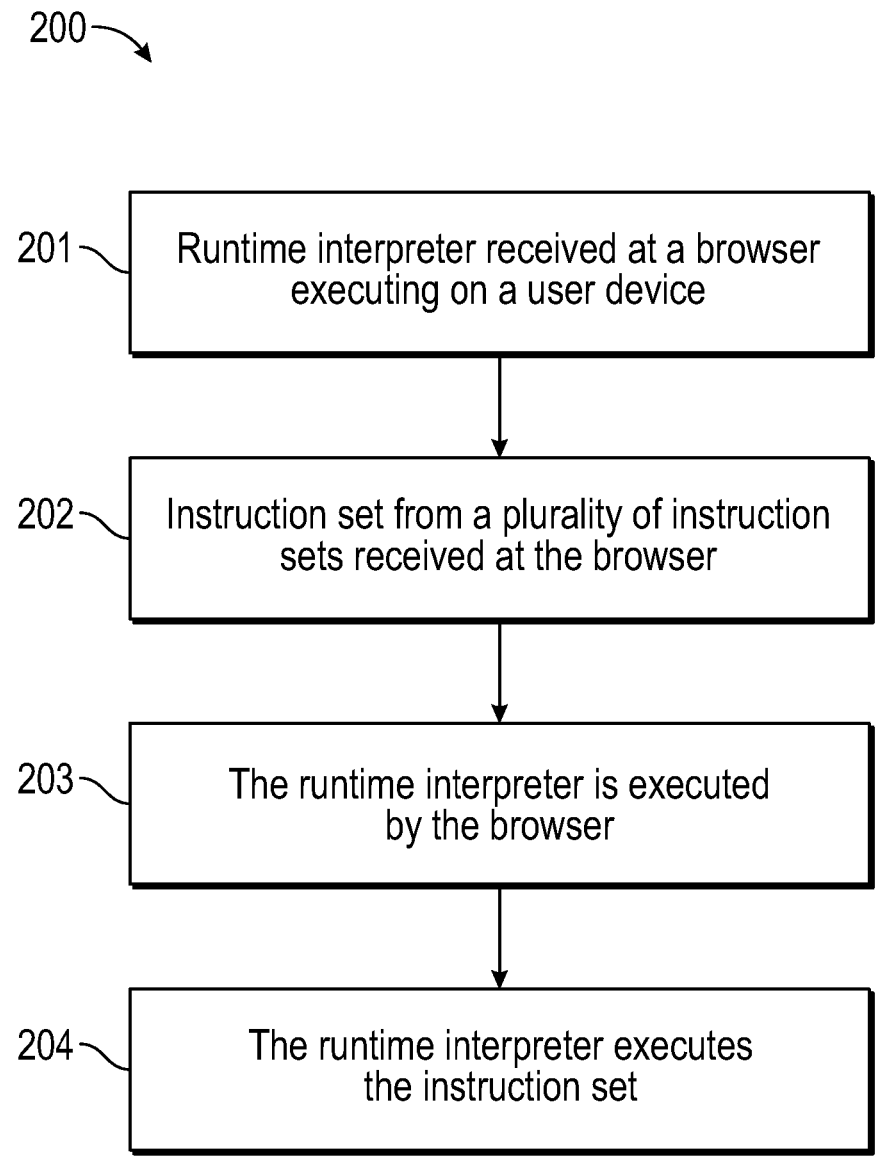
FIG. 2: shows a flow diagram illustrating a method in accordance with an embodiment of the invention.

Referring to FIG. 2, a method 200 in accordance with an embodiment of the invention will be described.

In step 201, a runtime interpreter is received at a browser executing on a user device (e.g. 114). The runtime interpreter may be received via a bootstrap web-page which is first requested from the first web server 101 by the browser. The bootstrap web-page may define the loading of various parameters including tag information for the device 114, a link to local storage at the device 114, a link to a style-sheet, and a link to the runtime interpreter. The runtime interpreter may be loaded asynchronously and may be retrieved from the first web server 101, or another server, if not already stored locally.

The runtime interpreter may be defined within a browser-supported scripting language such as JS or ActionScript. The runtime interpreter may include a CSS.

In one embodiment, the runtime interpreter is received at the browser and stored in a memory at the user device 114. The memory may be an application cache and the runtime interpreter may be retrieved from the application cache by the browser for subsequent execution.

The runtime interpreter may include functionality to permit execution within a plurality of different environments and within a plurality of different device types.

In step 202, an instruction set from a plurality of instruction sets stored, for example, at a second web server 105 is received at the browser. The instruction set may be composed within a structured language, such as XML or JAVASCRIPT Object Notation (JSON). Preferably the structured language is human readable and/or composed of attribute-value pairs or, otherwise, subject-based.

The instruction set may be composed of a plurality of objects. Each object may comprise a directive and set of supporting data. One or more of the objects may define modifications to a Document Object Model (DOM) represented and displayed by the browser.

Each object may define any one of the following: variable setting, widget specification, web form, graph, map, or a page. The plurality of objects may be defined within a hierarchy within the instruction set.

One or more of the objects may include services requests, such as the retrieval or modification of data. The requests may be external requests, that is, they may relate to data stored outside the user device 114. It will be appreciated that the data may also be stored at the user device 114, for example, within a local cache. Access to the data may be orchestrated via the third web server 110. The third web server 110 may communicate with one or more servers (such as view servers) to fulfil the request. A request may include a payload. The payload may include reference to data to be retrieved or data to be modified. The request may include a domain and action to be performed in relation to the payload.

The instruction set may define a target state.

In step 203, the runtime interpreter is executed by the browser. During execution, the runtime interpreter may check the capabilities of the device 114 (e.g. by querying the device about its capabilities) and checks session information stored within the local storage at the device 114. The session information may define the instruction set. The capabilities of the device 114 checked by the runtime interpreter may include hardware and operating system capabilities such as: existence of touch input, mouse input, a camera, and/or an accessible file system; and the dimensions of a display (e.g. 117) at the device 114.

The runtime interpreter may load the instruction set (if not already received) and store it within local storage (e.g. in memory 116).

The runtime interpreter may load pre-stored information relating to previous execution of the instruction set, such as a target page.

In step 204, the runtime interpreter executes the instruction set. The runtime interpreter may execute the instruction set in accordance with device capabilities established during the check.

During execution of the instruction set, the runtime interpreter may load a previously stored state at the user device 114. A state may be stored within a previously loaded page generated by the runtime interpreter for the instruction set, local storage (e.g. at 116) maintained by the browser, or a local database (e.g. at 116). A previously stored state may include the previously rendered page.

The runtime interpreter may execute one or more of the plurality of objects within the instruction set in accordance with the hierarchy of objects defined within the instruction set.

The runtime interpreter may render a specific page defined within the instruction set. The specific page may be defined within the instruction set as the main page or the specific page, if previously stored, may be the last page rendered by the runtime interpreter for the instruction set.

The runtime interpreter may be event-driven and, after, for example, rendering a page, wait for user, device, or network action before processing further objects within the instruction set.

The runtime interpreter may store state at the user device 114 by modifying the DOM, storing information within local storage maintained by the browser, or by capturing requests sent to a server, such as the third web server 110, and/or responses received from the server.

The runtime interpreter may, in response to rendering pages, modify or supplement the CSS dynamically.

The runtime interpreter executing the instruction set at the device 114 may then provide and execute a web application defined by the instruction set to the user of the device 114.

Various embodiments of the invention will now be described with reference to FIGS. 3 to 8.

Programmers use languages to express to computers the sequence of actions the computers are to execute.

Commonly used programming languages are by definition driven by formal logic and mathematics. In modern Computer Science, there are useful academic distinctions applied to groups of languages such as Procedural languages, Functional languages, Imperative languages, Declarative languages, etc. All of these distinctions, however, refer to specific manipulations of data with rigorous mathematically logical constraints.

In embodiments of the present invention, this type of logic is encapsulated in a JavaScript runtime: display logic on the client, and in View Controllers: analytical logic in the cloud. NB, hereafter, all references to "runtime" refer to "JavaScript runtime".

By encapsulating the logic this way, the flow of the system can be specified using a strictly object-oriented method, directly describing target states and the navigational relationships between these states. This is done by a "recipe" file. For illustrative purposes here, the JSON format is used to define the recipe file, but any object description language (e.g. XML or structured English) could be used instead.

Embodiments of the present invention can be divided into, at least, three distinct and logical services:

1. An event-oriented runtime, responding to interaction triggers from users and from cloud services;
2. Request-oriented View Controllers, responding to structured requests from the Runtime;
3. An object-oriented recipe file containing structured descriptions of target states for the system.

System Logic, the capability of interacting with input/output systems like smartphones, tablets, laptop computers, watches, smart glasses, smart projectors, etc. is contained within the runtime. This layer has no business logic but is very "smart" about the capabilities of its host device.

The recipe describes a target state in an object-oriented manner and is "executed" by the runtime.

Business logic is deconstructed and divided among the View Controllers and the recipe. The View Controllers are programmed to answer queries of arbitrary complexity which may include data capture, retrieval, correlation, classification, and manipulation. The recipe provides a framework for collecting, filtering, and retrieving data in various formats, and specifies logical navigation paths through the system.

Figure 3:
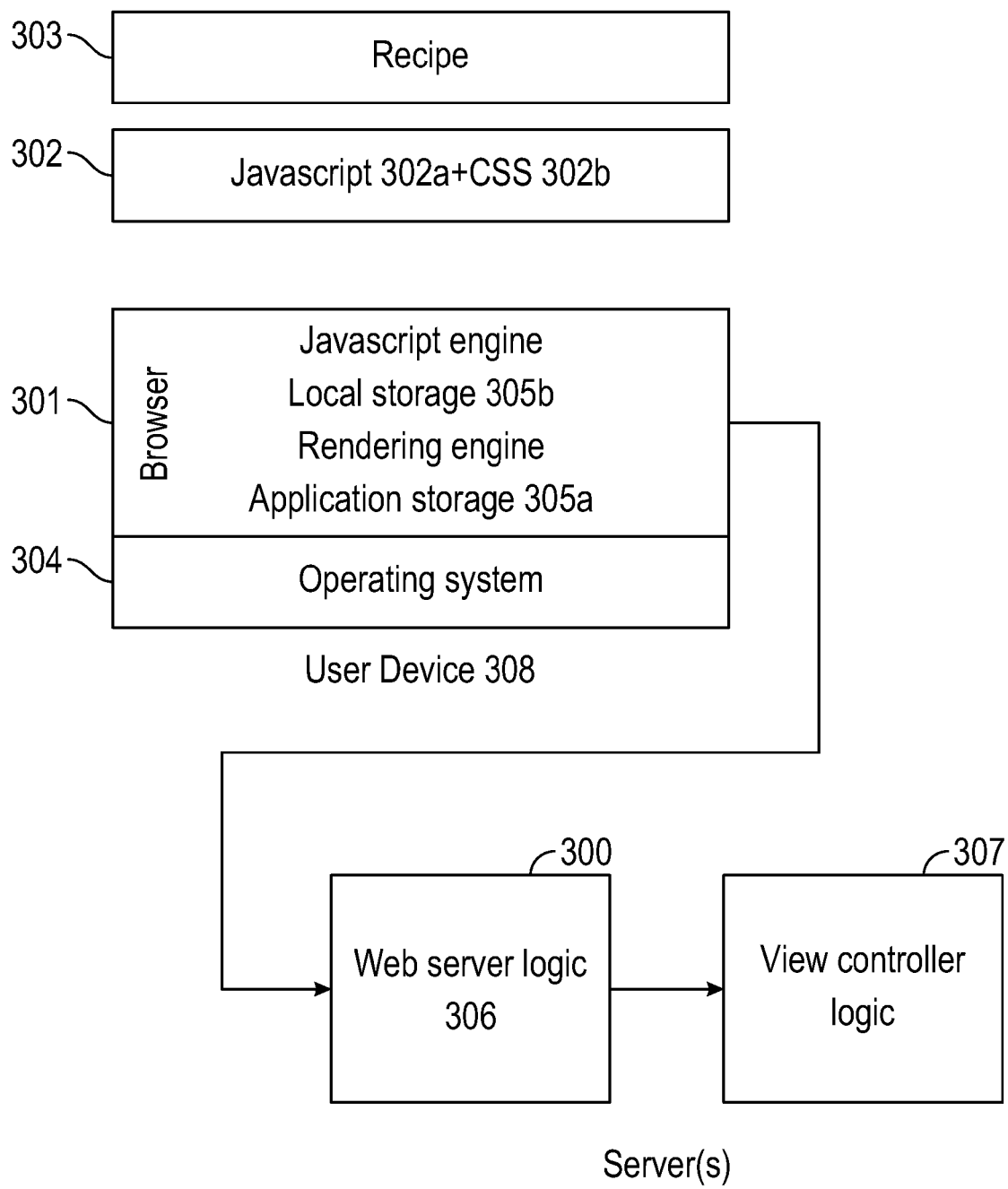
FIG. 3: shows a block diagram illustrating a system in accordance with an embodiment of the invention.

A method in accordance with embodiments of the present invention will now be described with reference to FIG. 3.

As a first step, a web page (in HTML) is served by the server 300 to the browser 301. This block of HTML includes links to a JS file 302a, a CSS file 302b, an application manifest file, various graphics resources needed by specific devices (for home screen app icons, desktop browser favicons, etc.), and a JSON file 303 serving as the "recipe" for the app's behaviour. In this embodiment, the browser 301 can be thought of as providing a "virtual machine" executing on the operating system 304, the JS/CSS 302 as the "runtime" environment, and the JSON recipe 303 as the "program" in its traditional sense. The JS/CSS 302 and supporting graphics are stored in applicationCache 305a, and the JSON recipe is stored in localStorage 305b. This means that the program persists, whether running or not, on the local device until it is explicitly erased or is reloaded when the application manifest is changed, signalling that a new version is available.

When those files are loaded by the browser 301, control is handed off to the JS/CSS 302. The JS 302 then loads and executes the commands contained in the JSON recipe 303.

State is maintained in the browser 301, in localStorage 305b, and persists until cleared. The runtime 302 keeps track of recent interactions and details and this makes for a more natural experience for the user.

Latency is minimal because navigation and state are determined and maintained locally.

Interaction with the server(s) 300 only occurs when data is needed from a database or other service. The server(s) 300 can manage the interaction using web server logic 306 and coordinate requests originated by the runtime 302 with one or more view controllers 307. The web server logic 306 and view controllers 307 may exist on the same server or different servers.

Screen rendering is, in general, faster because generally HTML is no longer parsed, and rendering optimisations can be supported within the JS/CSS 302. The DOM is directly manipulated by the JS/CSS 302 already resident in the browser 301.

The program logic is effectively stored within the JSON recipe 303 in the browser 301, which makes the web app completely autonomous. Once loaded, the browser 301 does not depend on the server 300 for navigation; the server 300 becomes a data service resource at the command of the app running on the client. The app can, in theory, run for weeks, being opened and closed from the browser 301 without ever contacting a server 300. Embodiments of the present invention, therefore, extend the capabilities of a "single-page web app" to encompass a rich, complex set of business logic and navigation.

As a practical matter, the amount of data passed back and forth between browser 301 and server 300 is kept extremely low, with its advantages in reduced communication costs, reduced radio power consumption, and reduced latency.

This autonomy extends to the appearance and interaction of the app based on the device 308 it's running on. From one JSON recipe 303, at runtime, the logic inside the JS/CSS 302 makes judgments about the appearance and interaction of each component in each page. For example:

If the device 308 is touch-enabled, the system will react appropriately to touch events and gestures;
If the device 308 has a mouse, the system will react appropriately to mouse events and motion;
If the device 308 is tall and narrow, a list is stacked in a pleasing and easy-to-grasp manner;
If the device 308 is wide, a list is spread out in a more column-oriented representation;
If the device 308 has a camera, it will enable photographic input where appropriate; and
If the device 308 has a local filesystem, uploads and downloads can be triggered.

The runtime 302, therefore, provides:
abstraction across devices
runtime adaptability to best fit the client device 308 (and window size)
lowest possible latency for interactions
autonomous, recipe-driven, event-driven interactions
runtime reconfigurable business logic in recipes (recipes can be swapped while running, under client control)

Figure 4:
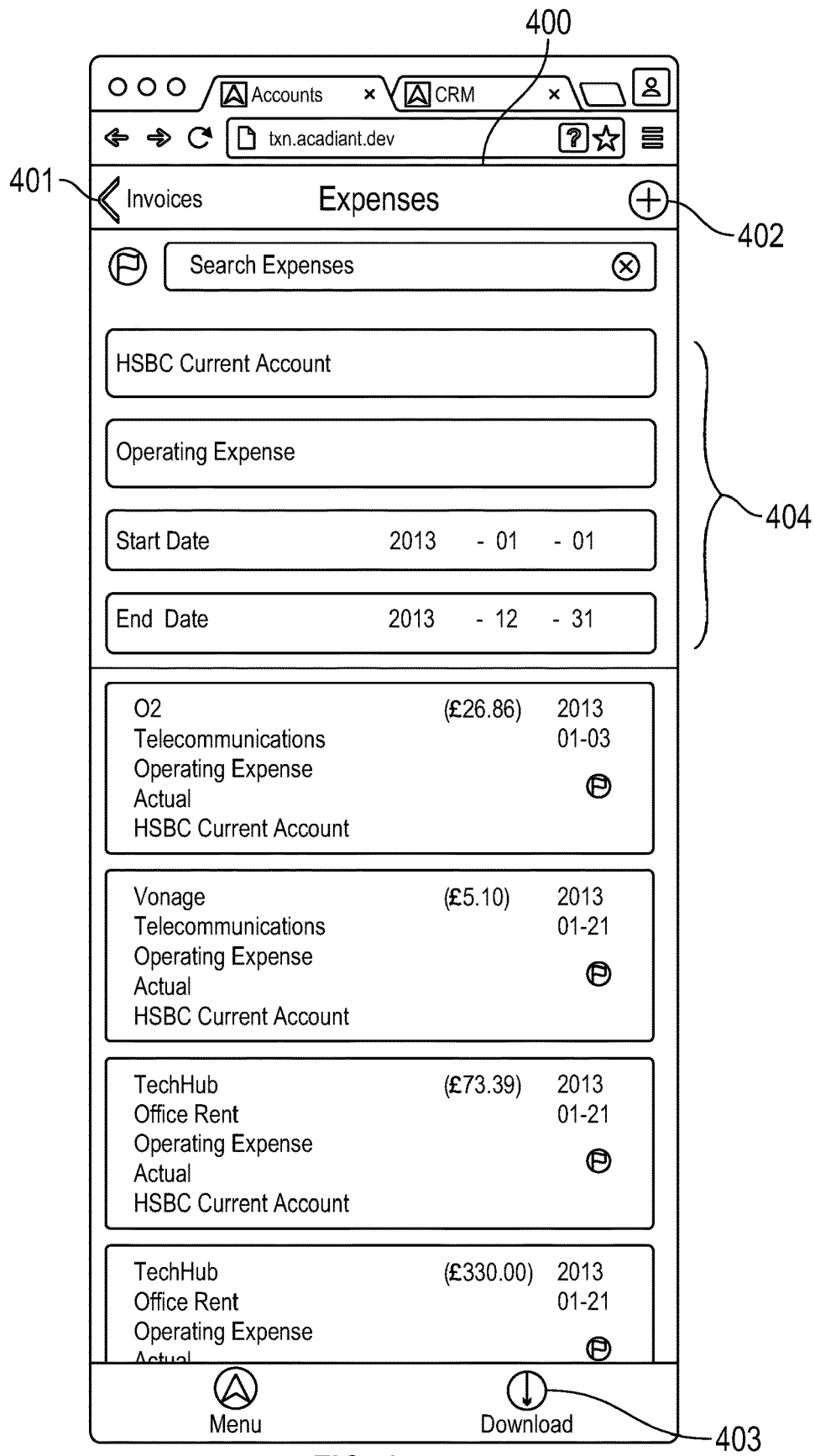
FIG. 4: shows a screenshot illustrating a page generated by recipe executed by a runtime in accordance with an embodiment of the invention.

FIG. 4 shows the rendering of an exemplary recipe by the runtime 302.

There is one master object generated by the runtime 302 from this recipe: the Page 400. There are (amongst others) four objects contained within the Page 400: a Navigation control 401, two Action Triggers 402 and 403, and a List Filter 404.

The Page 400 may be described in this recipe thusly:

```
"av-expense-list":[
    {"avSetPage": {"avId":"av-expense-list"}},
    .
    .
    .
    {"avRevealPage": {"avId":"av-expense-list"}}
]
```

A Page is an array of objects. An object will be a directive with a set of supporting data. In this example, the page array is labelled av-expense-list, and this label serves as a navigation target from other objects in the recipe. At a minimum, in this embodiment, two directives are used: avSetPage to open the description and avRevealPage when the description is complete. avSetPage sets a reference ID for the page, and avRevealPage requires that same reference ID to know which page to reveal.

This Navigation object 401 and Action Trigger object 402 are specified thusly:

```
"av-expense-list":[
    .
    .
    .
    {"avSetNavBar":{
            "avTgt":"av-expense-list",
            "avId":"av-expense-list-navbar"
        }
    },
    {"avSetTool":{
            "avTgt":"av-expense-list-navbar",
            "avC":"Fetch",
            "avI":"newItemIcon.svg",
            "avP":"av-expense-new",
            "avL":""
        }
    },
    {"avSetNavEscape":{
            "avTgt":"av-expense-list-navbar",
            "avI":"leftArrowIcon.svg"
        }
    },
    .
    .
    .
]
``` avSetNavBar specifies that there is a Navigation Bar at the top if the target page av-expense-list, and the Navigation Bar has its own ID of av-expense-list-navbar.

avSetTool specifies there is an Action Trigger contained in av-expense-list-navbar. Its Action (Command) is "Fetch", the Page to fetch is "av-expense-new", and the Icon to display is "newItemIcon.svg". There is no Label.

avSetNavEscape specifies the same Navigation Bar contains a Navigation (Escape) which will by default return to the previously displayed Page. This Navigation uses "leftArrowIcon.svg" as its Icon and the default Title of the previously displayed page as its Label.

The Action Trigger 403 is specified thusly:

```
"av-expense-list":[
    .
    .
    .
    {"avSetTabBar":{
            "avTgt":"av-expense-list",
            "avId":"av-expense-list-tabbar"
        }
    },
    {
        "avSetTab":{
            "avTgt":"av-expense-list-tabbar",
            "avC":"download",
            "avP":"av-nop",
            "avI":"downloadIcon.svg",
            "avL":"Download",
            "avD":"bottomToTop",
            "avDomain":"TXN",
            "avAction":"dump_date_range",
```

```
        "avHash":{
            "bankacct_id":"bankacct_id",
            "date0":"begin_date",
            "date1":"end_date"
        }
    }
},
.
.
.
]
``` avSetTabBar specifies that there is a Tab Bar at the bottom if the target page av-expense-list, and the Tab Bar has its own ID of av-expense-list-tabbar.

avSetTab specifies there is an Action Trigger (Tab) contained in av-expense-list-tabbar. Its Action (Command) is "Download", the Page to fetch is "av-nop", designating no operation, and the Icon to display is "downloadicon.svg". The Label is "Download". The Direction from which to display a new Page would be "bottomToTop". In order to retrieve the downloaded data, the Domain and Action to send to the view controller 307 is TXN and dump_date_range, which requires a Hash of bankacct_id, date0, and date1, which draw from the page's data fields bankacct_id, begin_date, and end_date, respectively.

The List Filter object 404 is specified thusly:

```
{"avSetListView":
    {
        "avTgt":"av-expense-list",
        "avId":"av-expense-list-view",
        "avDomain":"TXN",
        "avAction":"fetch",
        "avP":"av-expense-edit",
        "avM":"Loading Expenses...",
        "avEmpty":"No Expenses Found",
        "avListFilters":[
            {
                "avDomain":"BANKACCT",
                "avAction":"tags",
                "avN":"bankacct_id",
                "avEmpty":"Any Account",
                "avClear":"Allow Any Account"
            },
            {
                "avOpts":{
                    "opex"    :"Operating Expense",
                    "capex"   :"Capital Expense"
                },
                "avDefault":"opex",
                "avMlt":false,
                "avN":"ex"
            },
            {
                "avDate":"gte_date",
                "avK":"date",
                "avN":"begin_date",
                "avL":"Start Date"
            },
            {
                "avDate":"lte_date",
                "avK":"date",
                "avN":"end_date",
                "avL":"End Date"
            }
        ],
        .
        .
        .
    }
}
```

This List View, called av-expense-list-view, is contained inside the Page av-expense-list. The runtime 302 can retrieve the list by sending a request to a view controller 307 via the server 300 with the Domain TXN and the Action fetch. The Page to navigate toward when one list item is selected is av-expense-edit. There are four List Filters: bankacct_id, ex, begin_date, and end_date.

Because the recipe describes each target state using a hierarchical collection of objects, it can be interacted with in a graphical tool, allowing a business analyst to compose target pages by dragging and dropping representations of such objects.

Furthermore, because the recipe contains no system programming and is only a set of objects, it also lends itself to allowing a business analyst without any formal programming experience to describe the business logic for a new product.

The recipe file may be written in JSON, as in the above example, for convenience and ease of parsing. However, it will be appreciated that the JSON format is not the only possible solution and that, with suitable modification to embodiments of the invention, XML, LISP or even structured English could be used.

The JavaScript Runtime 302

The runtime 302 composes a page, element by element, based on:

a) a recipe 303 containing components and associated business logic; based on b) its own knowledge of the semantic meaning and behaviour of each type of component; based on c) the characteristics and capabilities of the device 308 it's running on, which it has discovered by testing for things such as screen size, touch capabilities, geographic positioning systems, etc.; and, d) the state of the DOM over which it has complete and exclusive control, including appearance and invisible metadata.

When not actively modifying the state of the DOM, the runtime 302 is continuously awaiting interactive triggers from the device 308, i.e. via the browser 301 (including user-triggered events) and from the cloud (e.g. server(s) 307).

The runtime 302 is, broadly, capable of responding in one of two ways to a triggered event. It can (a) change the state of the application by modifying the DOM; and (b) it can request action from the cloud (e.g. 300/307) by sending a subject with supplemental data to a view controller 307 via the web server 300.

The runtime 302 therefore is always, with full authority, orchestrating the activities of the app on the device based on those four influences, and with those two broad capabilities.

The runtime 302 uses loaded CSS for most efficient use of GPU and can supplement and modify styles dynamically to improve performance.

Referring to FIGS. 5a to 7, a method illustrating execution of the runtime interpreter by a browser and the execution of a recipe by the runtime interpreter in accordance with an embodiment of the invention will be described.

In step 501, the user navigates to a URL for a webpage in a browser 301 by entering a link, or selecting a link or a homescreen icon on the user's device 308.

In step 502, if there is not already an open session with the web server (e.g. 300) then a login process occurs as described later in this document in relation to FIG. 5b.

In step 503, otherwise, or once the login process successfully concludes, the webpage loads. Exemplary pseudo-code for the webpage is shown below:

```
<head>
Sets <meta> tags for devices
Link to Application Cache Manifest
Link to Runtime CSS
<body>
Link to JS Runtime
Placeholder logo
```

The Placeholder logo may be displayed while the runtime (e.g. 302) is loading.

In step 504, if the runtime is not already available on the device 308 (for example, stored in the application cache for the browser), it is retrieved from the web server (e.g. 300) otherwise it is loaded from storage on the device 308 (e.g. the application cache 305a). Loading of the runtime may occur asynchronously.

In step 505, the runtime is executed as further described later in this document in relation to FIGS. 6a to 7.

Figure 5A:
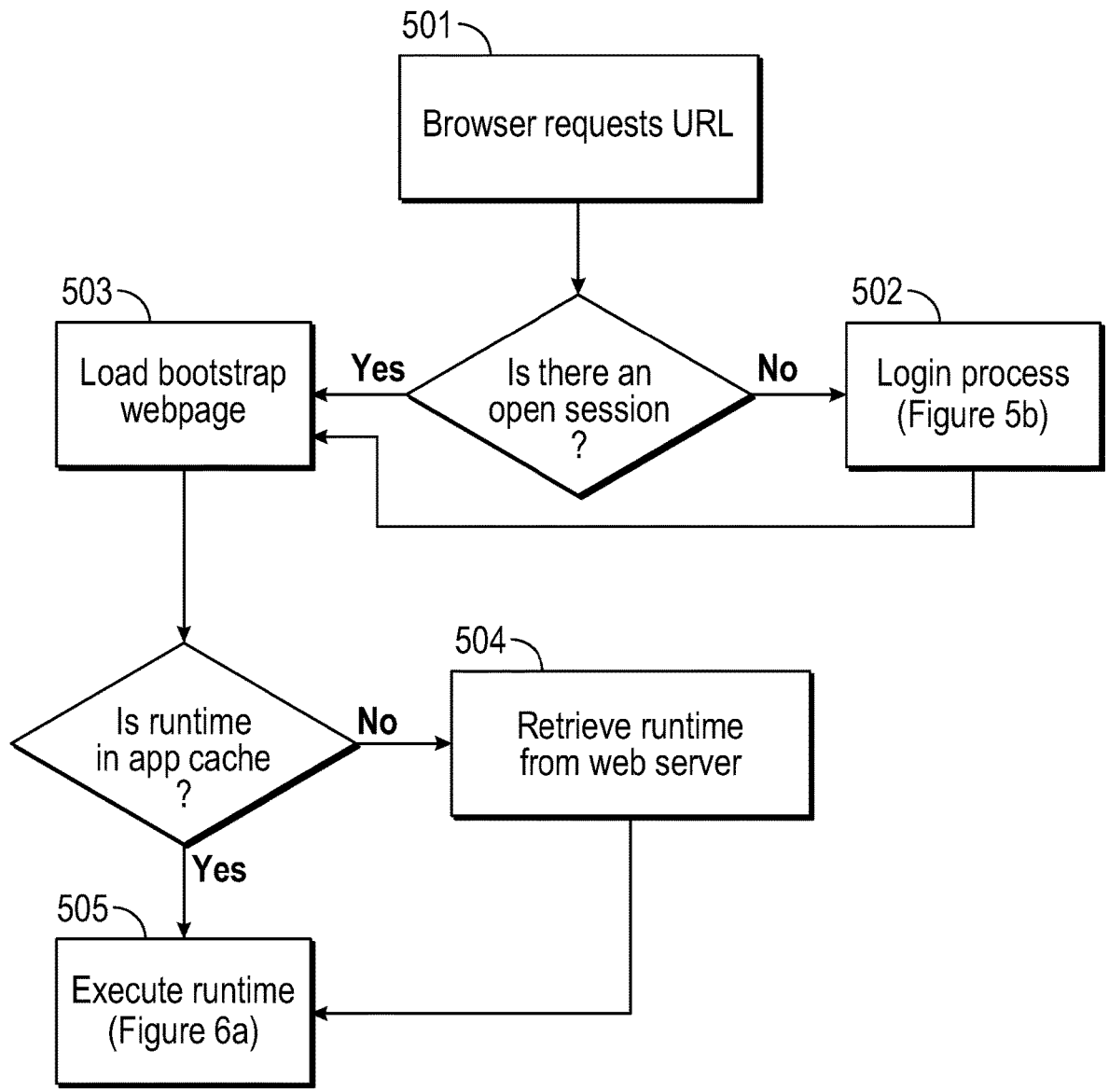
FIG. 5a: shows a flow diagram illustrating a method for bootstrapping the runtime in accordance with an embodiment of the invention.
Figure 5B:
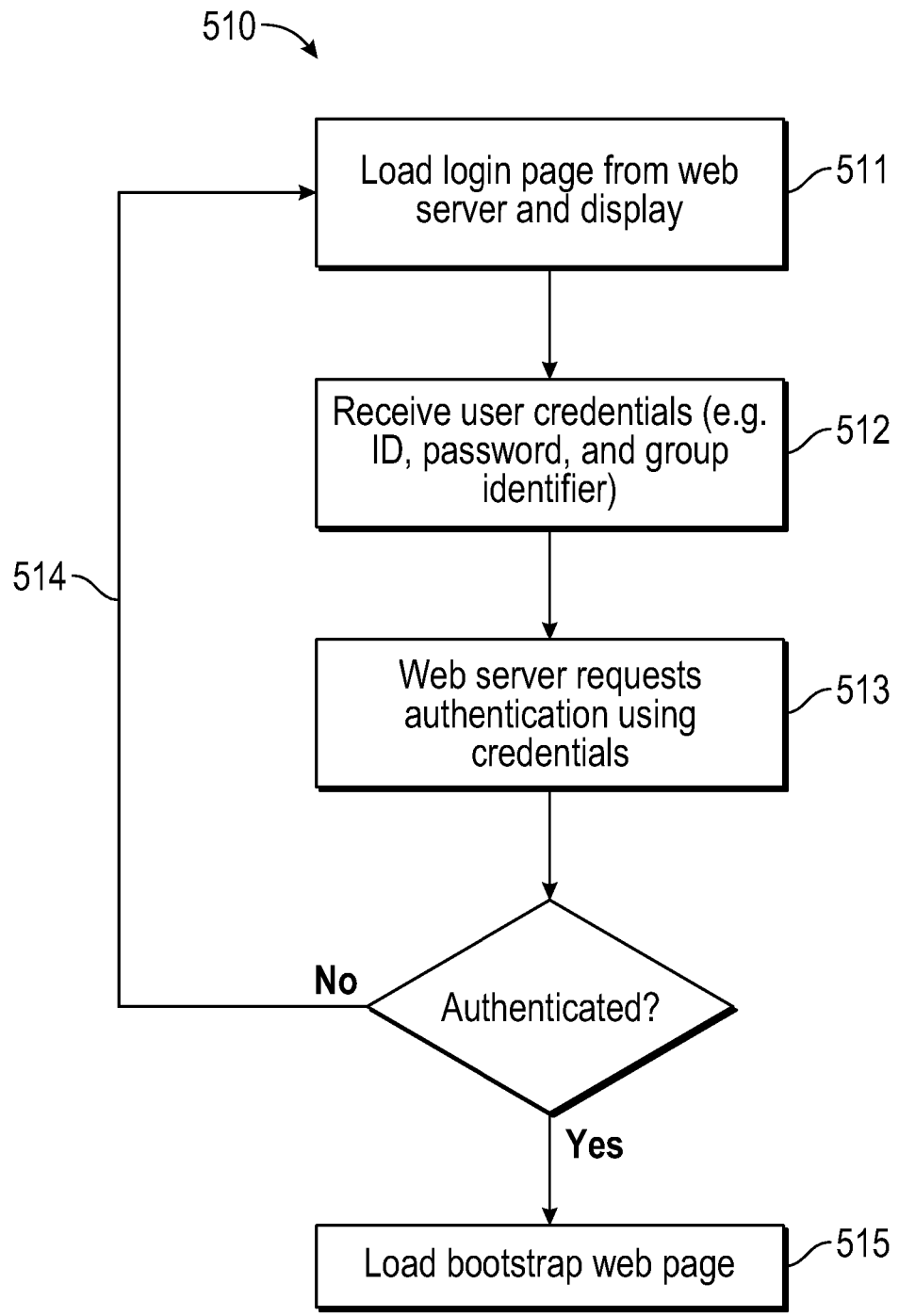
FIG. 5b: shows a flow diagram illustrating a login method in accordance with an embodiment of the invention.

Referring to FIG. 5b, the login process 510 will be described.

In step 511, a login page is loaded from the web server (e.g. 300) and displayed.

In step 512, the user enters id, password, and group.

In step 513, the web server (e.g. 300) requests authentication from a view controller (e.g. 307) in cloud.

In step 514, if authentication is rejected, steps 511 to 513 may be repeated.

In step 515, if authentication is accepted, the web server (e.g. 300) responds with the smart web page (i.e. step 503).

Figure 6A:
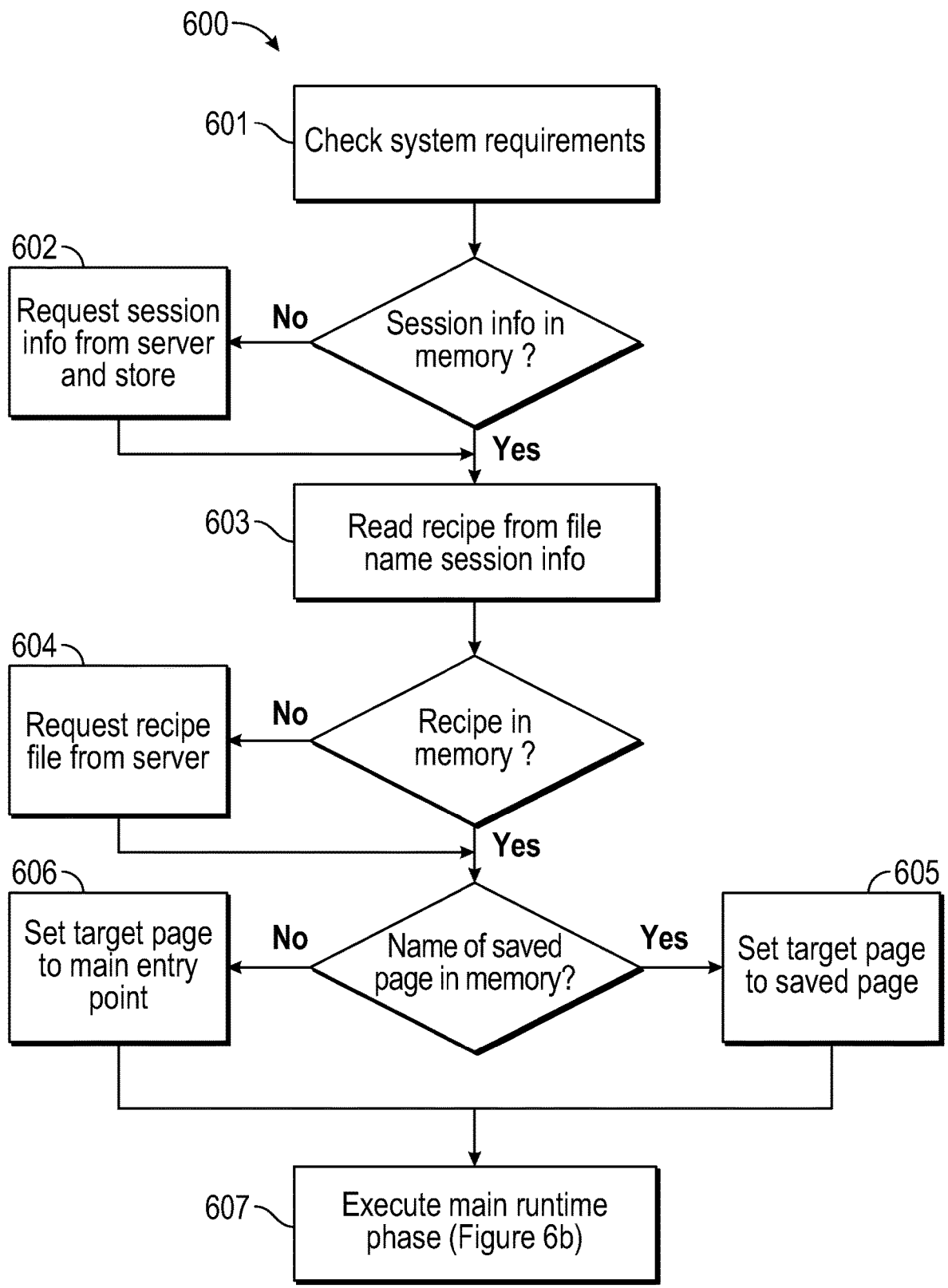
FIG. 6*a*: shows a flow diagram illustrating a method for initialising the runtime in accordance with an embodiment of the invention.

Referring to FIG. 6a, initialisation 600 of the runtime 302 will be described.

In step 601, the runtime 302 checks system capabilities (for example, whether the device 308 has a touch interface, a mouse, a cache, local SQL data storage capability, its screen dimensions, and the presence of other specialized hardware.

In step 602, if session information is not already stored in memory (e.g. 305b) at the device 308, it is retrieved from the web server 300 and stored in memory at the device 308, otherwise session information is loaded from memory.

User preferences are retrieved from the session, including but not limited to: preferred language, preferred currency, preferred character set for names, preference for black-and-white over colour images; preference for number spacing to ease recognition for people with autism, and any application-specific preferences that may helpfully customise the user experience.

In step 603, the file name for the recipe within the session information is extracted.

In step 604, if the recipe is not already stored in memory (e.g. localStorage 305b) at the device, it is retrieved from the web server (e.g. 300) and stored in memory (e.g. localStorage 305b) at the device 308, otherwise the recipe is loaded from memory (e.g. localStorage 305b).

Other assets such as PNG or SVG files may also be loaded from localStorage 305b after first fetched, to avoid redundant network access.

In step 605, if a saved page name is stored in memory (e.g. 305b) at the device 308, having recorded the last known point in the program's execution on the device, the target page is set to the saved page.

In step 606, if the saved page name is not stored in memory (e.g. 305b) at the device 308, the target page is set to the main entry point defined in the recipe.

Figure 6B:
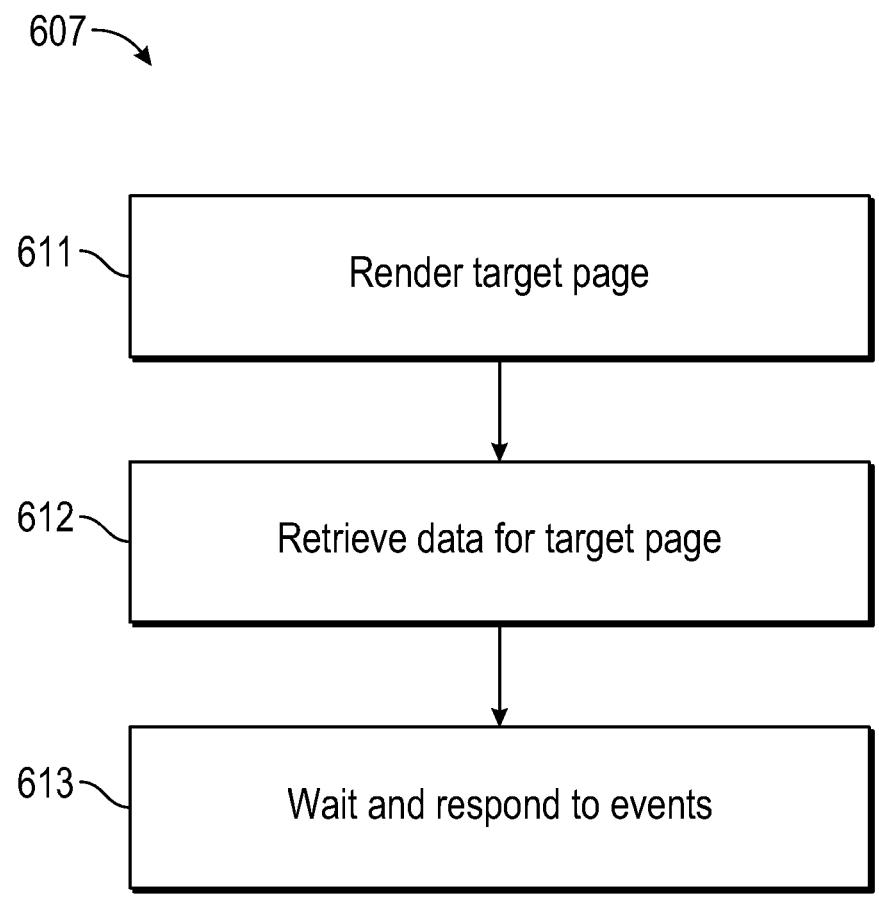
FIG. 6*b*: shows a flow diagram illustrating a method for executing, by the runtime, a recipe in accordance with an embodiment of the invention.

In step 607, the main runtime phase will execute as described in relation to FIG. 6b below.

The applicationCache (e.g. 305a) would need refreshing when there is an update to the latest client application code (runtime, recipes, or supporting assets) newly available on the host server (e.g. 300). This is indicated by an update to the application manifest file. If such an update is available, then the next time an appropriate, non-disruptive point is reached in interaction—either the application is freshly summoned from the home screen, or a step is reached in the recipe file indicating that now would be a good time to update the cache if needed: "avCheckCache"—then the runtime, recipe, and all supporting files are reloaded, the runtime rechecks its environment, and resumes execution from the last stored point in the recipe.

Figure 6C:
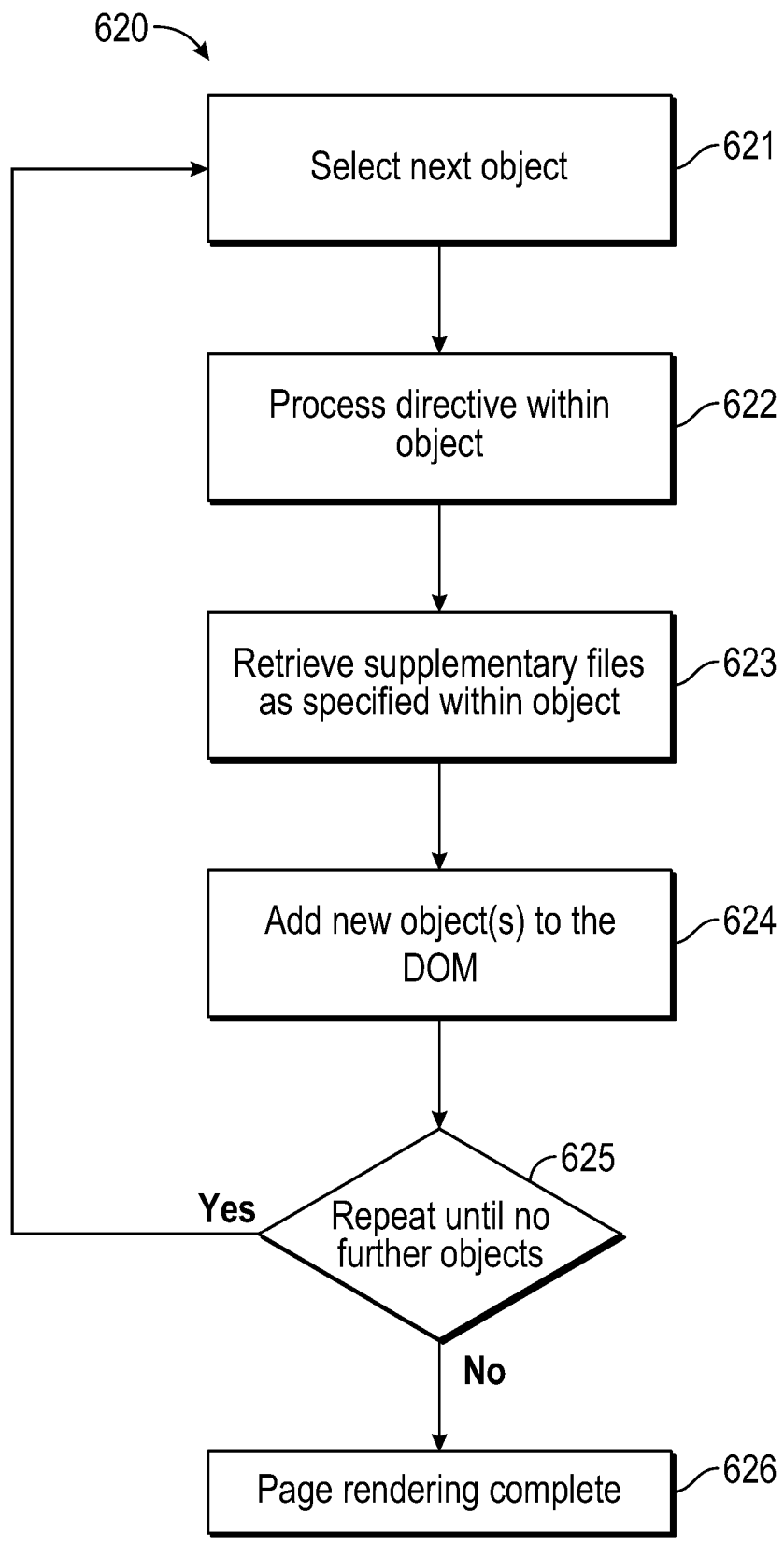
FIG. 6*c*: shows a flow diagram illustrating a method for rendering, by the runtime, a page according to a recipe in accordance with an embodiment of the invention.

In step 611, the target page is rendered in accordance with a rendering process described in relation to FIG. 6c.

Figure 7:
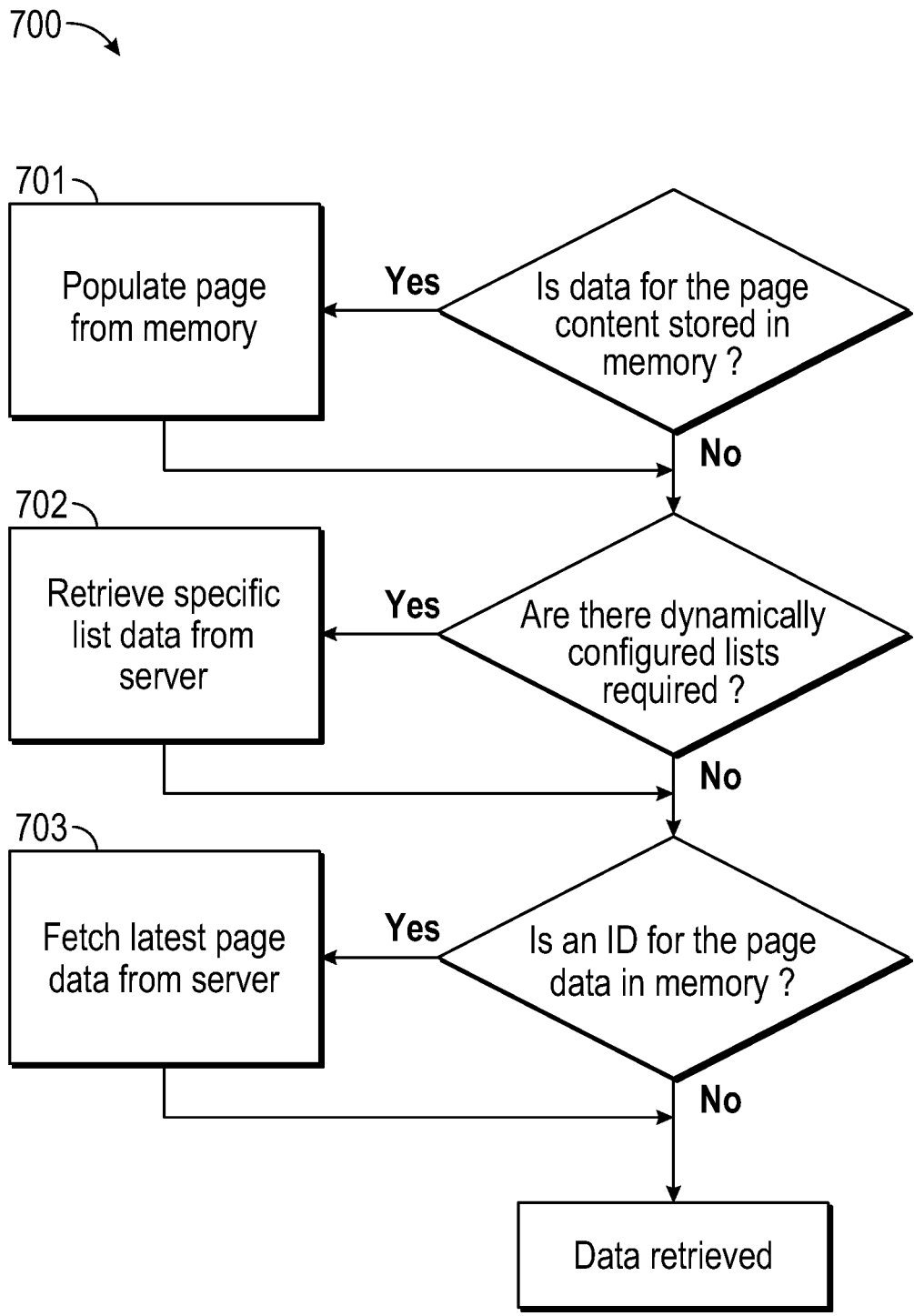
FIG. 7: shows a flow diagram illustrating a method for retrieving data in accordance with an embodiment of the invention.

In step 612, data for the target page is retrieved in accordance with the method described in relation to FIG. 7. In some embodiments, at least parts of steps 611 and 612 could occur interleaved. For example, data may be requested, retrieved and displayed asynchronously when a directive is processed during rendering of the target page such as a directive requesting supplementary system data which may trigger a data request from the web server (e.g. 300).

In step 613, the runtime waits and responds to events. Events may include keyboard input, mouse clicks, server messages, GPS updates from the device, DOM transitions, etc.

The runtime is a collection of sequences which are executed when triggered by events. These sequences can asynchronously trigger further sequences. This environment is therefore highly dynamic, and the sequencing of actions and events is referred to "orchestration".

At this point, the runtime environment is both static (unchanging) but highly dynamic (ready to respond in many different ways depending on event triggers). Because the recipe is held locally and the state is maintained locally the web application can operate for a long time and with a high degree of complexity, without ever (potentially) having to request data from the cloud, and without ever having to request business logic flows from the cloud. The client controls the server, not the other way around.

Referring to FIG. 6c, the rendering 620 of a page defined by the recipe by the runtime will be described.

A page is an array of objects. Each object is a directive/command with supplementary specifications as needed. The directive/command and supplementary specifications may be defined by primary and supplementary keys respectively. Examples of keys for use in recipes are described later in this document. It will be appreciated that this description provides an exemplary list only and that many, many other directives and supplementary specifications can be envisaged.

Usually the first object in the array will name the page and create a page object in the DOM, and the last object will make the completed page the active page in the DOM.

In step 621, the next object in the array is selected.

In step 622, the directive within the object is processed.

In step 623, any supplementary files are retrieved as specified within the object.

In step 624, new objects are added to the DOM.

And steps 621 to 624 are repeated until there are no further objects as determined in step 625 in which case the rendering process concludes in 626.

Referring to FIG. 7, the retrieval 700 of data for the page will be described.

In step 701, if data for the page content is stored in memory, then page data is populated from memory.

In step 702, if there are dynamically configured lists noted in the recipe, then retrieve the specific list data from the server In step 703, if an ID for page data is stored in memory, then data is retrieved from the server.

In some of the above embodiments, as system logic is contained within the runtime interpreter, it can be debugged and optimised. When device capabilities and behaviours change and as new types of hardware are introduced, the runtime interpreter can be modified to improve performance. Furthermore, new widgets (interface modules) can be defined within the runtime interpreter, and then tailored and positioned through recipe instructions.

In some of the above embodiments, as "business logic" is contained within the recipe, it can be mapped to human interactions and can be "programmed" by a business analyst with no knowledge of browser functions or behaviours.

Therefore, using the existing functions in the runtime:
a) new apps can be defined much faster;
b) debugging and optimising can be limited to the business logic by developers/analysts; and,
c) developers/analysts can be reasonably sure the apps will behave well on any device.

Embodiments of the invention may provide the following advantages: minimising communication with server leading to a reduction in both bandwidth costs and latency; increasing responsiveness for the user; avoiding computationally costly parsing of HTML by using direct DOM manipulation instead; providing predefined widgets; and providing for reuse of objects/resources such as PNG/SVG graphics.

Furthermore, the runtime may be able to maintain independent system maintenance records, such as an "event inventory", to provide superior clean-up and garbage collection, leading to better performance.

In certain respects, embodiments of the invention may bring the capabilities of native (SWIFT or JAVA) frameworks to the web app. And may, in fact, provide interactions superior to those available in IOS or ANDROID native frameworks, such as mouse, touch, keyboard, scroll interactions and behaviours; swipe interactions; collapsible tag lists; and date field handlers.

The runtime environment for embodiments of the present invention may also fulfil the requirements of an advanced Turing Machine, that is, a computer in its own right, because:

The runtime acts as the CPU.
The runtime reads the recipe as its sequence of commands, its "program".
The runtime has many entry points:
The startup entry point to initialise the system, and
Entry points reached when a browser event is triggered.
The runtime uses localStorage/sessionStorage/webSQL/indexedDB as its "memory".
The runtime uses cloud storage (e.g. AMAZON S3) and other web services (e.g. HTTP GET) as a "file system".
The runtime uses web services (through HTTP POST) as its non-volatile storage, its "database".

Payload

Directives which retrieve or modify data from/at the Web server (e.g. 300) do so by delivering commands comprising a payload to the Web server which may then be processed by a View server (e.g. 307).

Examples of how the payload for these directives may be defined are described below:

Grab all:

```
{
    "avDomain":"TRANSACTION",
    "avAction":"fetch"
}
```

This would fetch all transactions in the database and return them as an array of JSON objects.

Grab Nothing:

```
{
    "avDomain":"TRANSACTION",
    "avAction":"update",
    "record_number":"78048502801",
    "expense_type":"capex"
}
```

This would modify the record for one specific transaction (as specified by the record_number) to denote it was of "capex" expense type. It would return nothing, other than status:OK and count:1 to the runtime (e.g. 302) as an acknowledgment of a successful modification.

Grab Specific Fields:

```
{
    "avDomain":"BANKACCOUNT",
    "avAction":"tags",
}
```

This would select only predefined "tags" for all bank accounts in the database. These would be something like the record_number of each account, and a short description of the account, e.g.

```
[
    {
        "record_number":"085094385092",
        "short_description":"HSBC Current Account"
    },
    {
        "record_number":"085094385133",
        "short_description":"HSBC Savings Account"
    }
]
```

This may be particularly useful when requesting lists of items from which to choose. The runtime can display the short_description and work with the record_number.

The data returned from a View (via the Web server) to the runtime is in the form of a JSON array. Each array element is one piece of the data available in the form of a JSON hash ("key":"value"). The runtime parses this JSON array in three steps:

1) Does the key match the name of a field being searched, in a form or as part of a calculation? If not, ignore it. If so, use it.
2) Does the format (signature) of the value match the expected format for the matched field? If not, ignore it. If so, use it.
3) Take the data from the value and format it appropriately for display or other use on the device.

Each component has an expected format, usually designated as part of its DOM class. For example, av-ccy denotes a currency value is expected; av-text is a multilingual text field; av-plaintext is a plain text field; av-date is a date, etc.

A plaintext value returned in the answer will be a simple JSON string, e.g. "This is plain text."

A text value will be a multilingual hash, e.g.

```
{
    "text":"This is not plain text.",
    "language":"en"
}
```

Its signature is the set of two mandatory keys: text and language.

A currency value will be a multi currency hash, e.g.

```
{
    "amount":"−3.77",
    "currency":"GBP"
}
```

Its signature is the set of two mandatory keys: amount, and currency.

A date value returned in the answer will be a simple JSON string, but must be year-month-date:

"2015-06-30"

In most cases, the value received in the hash will not simply be put into the text portion of a DOM element. It will be formatted, metadata will be included as data-* attributes, and some validation will be performed.

Storage of Data at the Client-Side by the Runtime

DOM

The runtime may keep track of state by leaving notes to itself in the DOM as described below:

There are complementary approaches used, each where most appropriate.

1. Data-* Attributes

Example: The runtime may needs to track the value of a field as it is retrieved from a database, in order to know when the value has been modified by user or other activities on the client device.

```
<textarea
    data-db-value="This is the original value."
    data-value="This is the value as I edited it."
>
This is the value as I edited it.
</textarea>
```

2. CSS Classes

Example: The runtime will change the appearance of a checkbox when it is activated.

```
<input
    class='av-checkbox'
    value="false"
>
</input>
``` vs.

```
<input
    class='av-checkbox av-active'
    value="true"
>
</input>
```

Because it knows the state of the checkbox has changed, and it knows how to represent a checkbox appropriately on the device, it can make one or several changes to the presentation of the checkbox based on whether or not it has the class av-active.

LocalStorage

Modern HTML5 provides local, non-volatile data storage in a key:value store called localStorage.

The runtime uses localStorage to store the recipe after it fetches it from the Web server.

The runtime uses localStorage to store a page stack, which is an ordered array recording the pages visited in chronological order. This helps navigation "backward" through pages as "the stack is popped".

The runtime uses localStorage to stash recently entered or retrieved field data in order to more quickly re-compose and re-populate a page.

The runtime uses localStorage to store image files after they are fetched from the Web server. This is a convenience which makes it unnecessary to retrieve those images each time they are re-used in a newly composed page. These images may be button icons, user avatars, logos, or other useful graphics.

Local DB

In normal operation, the runtime stores data by sending a subject together with its associated data in a payload to a View via the Web server.

It is possible, however, for the runtime to intercept these payloads and store them in a local database on the device (this may be via either webSQL or indexedDB.)

This is a convenience which is available for temporary use when the device loses its connection to the Internet. During the period of isolation, of course, data recorded in the Cloud are not available. But in specific use cases, it is possible to download sets of data in anticipation of going off-line, and storing updates and new data sets in localDB until an Internet connection is again available.

An exemplary use case would be gathering of asset data in the field, where plant and equipment may be in remote areas, away from WiFi and cellular data coverage. Through the use of localDB, the data can still be entered and updated while in the field, and synchronised with the Cloud upon return from the field.

Structure of a Recipe File

The structure of a recipe file in accordance with embodiments of the invention will now be described.

A recipe file is a collection (a hash) of uniquely-named objects.

Each of these objects can be:

A variable setting (e.g. version number or language of the recipe);

A specification of a widget, such as a virtual keyboard;

A web form;

A graph;

A map;

A page.

A page is an Array of objects. Each object describes one component of a page, such as a navigation bar, a button, or a list view.

This can be considered a markup language, but differs in several significant ways from HTML:

The objects are more semantically complete, in that they are not simply graphical markup.

The objects include descriptions of dynamic interactions available in the page.

The objects include semantic information about higher-level business logic functions.

The objects include information for the runtime to use in composing requests to the web server.

The runtime uses the recipe, together with an analysis of the capabilities and characteristics of the device, to directly render an appropriate representation of the page, fitting the device.

The runtime uses the recipe as a guideline, together with the state of the page data, to render the page. This dynamic rendering will, for example, hide or expose or change the appearance of portions on the page depending on the content of the data.

The components of the exemplary recipe described in relation FIG. 4 will now be analysed to illustrate the semantic guidance therein.

"av-visit-edit":[

The name of the page description array.

```
{"avSetPage": {
        "avId":"av-visit-edit"
}},
```

Directive to open a page definition named "av-visit-edit".

```
{"avSetNavBar":{
        "avTgt":"av-visit-edit",
        "avId":"av-visit-edit-navbar"
}},
```

Directive to set a navigation bar inside the page, and set the name of the bar.

```
{"avSetNavEscape":{
        "avTgt":"av-visit-edit-navbar",
        "avI":"leftArrowIcon.svg"
}},
```

Directive to add an escape button to the navigation bar, including a graphic icon.

```
{"avSetTool":{
        "avTgt":"av-visit-edit-navbar",
        "avC":"Update",
        "avP":"av-visit-list",
        "avDomain":"VISIT",
        "avAction":"update",
        "avF":"av-visit-edit-form",
        "avL":"Done"
}},
```

Directive to add an action button to the navigation bar. This button is of the type "Update" with a label "Done". In executing the action, the runtime will gather the information contained in the form "av-visit-edit-form" and send it to the Web server with the domain "VISIT" and the action "update". After the action is completed, the Runtime will proceed to the page named "av-visit-list".

```
{"avSetNavTitle":{
        "avTgt":"av-visit-edit-navbar",
        "avL":"Edit Visit"
}},
```

Directive to add a title to the navigation bar. The title is "Edit Visit".

```
{"avSetForm":{
        "avTgt":"av-visit-edit",
        "avId":"av-visit-edit-form",
        "avFF":"av-visit-form",
        "avDomain":"VISIT",
        "avAction":"fetch"
}},
```

Directive to add a form to the page. The name of the form is "av-visit-edit-form" and it will use the form descriptor object "av-visit-form" (described below). In order to populate the form, the runtime will send a request to the Web server with the domain "VISIT" and the action "fetch".

```
{"avSetTabBar":{
        "avTgt":"av-visit-edit",
        "avId":"av-visit-edit-tabbar"
}},
```

Directive to add a tab bar to the (bottom of the) page "av-visit-edit".

```
{"avSetTab":{
        "avTgt":"av-visit-edit-tabbar",
        "avP":"avMain",
        "avL":"Menu",
        "avI":"acadiantButton.svg",
        "avD":"leftToRight"
} },
```

Directive to add a tab to the tab bar. When the tab is selected, the runtime will proceed to the page "avMain" with a left-to-right transition. The label for the tab is "Menu" and it will include an icon described by "AcadiantButton.svg".

```
{    "avSetTab":{
        "avTgt":"av-visit-edit-tabbar",
        "avP":"av-visit-history-list",
        "avRef":"recordid",
        "avI":"historyIcon.svg",
        "avL":"History"
} },
```

Directive to add a tab to the tab bar. When the tab is selected, the runtime will proceed to the page "av-visit-history-list" with data based on the reference contained in form field "recordid". The label for the tab is "History" and it will include an icon described by "historyIcon.svg".

```
{"avSetTab":{
        "avTgt":"av-visit-edit-tabbar",
        "avL":"Clear",
        "avI":"clearTabIcon.svg",
        "avC":"clear"
} },
```

Directive to add a tab to the tab bar. When the tab is selected, the runtime will clear any data contained in any form on the page. The runtime only exposes this tab of type "Clear" when there is data in the form; otherwise it is blurred. The label for the tab is "Clear" and it will include an icon described by "clearTabIcon.svg".

```
{"avSetTab":{
        "avTgt":"av-visit-edit-tabbar",
        "avDomain":"VISIT",
        "avInsertAction":"insert",
        "avUpdateAction":" update",
        "avF":"av-visit-edit-form",
        "avL":"Save",
        "avI":"saveIcon.svg",
        "avC":"save"
    } },
```

Directive to add a tab to the tab bar. When the tab is selected, the runtime will send any data contained in any form on the page to the Web server with a domain of "VISIT" and action "insert" if this is the first time the data has been submitted or with a domain of "VISIT" and action "update" if the data has been edited. The runtime only exposes this tab of type "save" when there is changed or new data in the form; otherwise it is blurred. The label for the tab is "Save" and it will include an icon described by "saveIcon.svg".

{"avRevealPage": {"avK":"av-visit-edit"}},

Directive to tell the runtime to make the page "av-visit-edit" the active page.

],

End of the page description array.

The components of an exemplary recipe for a form will now be described:

"av-visit-form":[

The name of the form description array

```
{"avInputField":{
        "avInput":"avdate",
        "avN":"date",
        "avL":"Date",
        "avDefault":"today"
    } },
```

Directive to define an input field in the form. This is of type "avdate" so the runtime will display a virtual keyboard customised for date entry when this field is in focus on the page. The name of the field is "date" and the label for the field is "Date". By default, the field will display today's date unless otherwise edited.

```
{"avSetTagList":{
        "avDomain":"PATIENT",
        "avAction":"tags",
        "avEmpty":"Select Patient",
        "avL":"Patient",
        "avN":"patient_id",
        "avMlt":false
    } },
```

Directive to define a tag list in the form. This displays a number of items for selection, and these items are retrieved from the web server with the domain "PATIENT" and the action "tags". When no tag is selected and the list is collapsed, it will display "Select Patient". The label for the tag list is "Patient". The name of the field is "patient_id". Because avMlt (multiple) is false, only one tag can be selected at a time.

```
{"avInputField":{
        "avInput":"number",
        "avN":"return_months",
```

```
        "avL":"Return to clinic in how many months",
        "avSetFocus":true
    }
},
```

Directive to define an input field in the form. This is of type "number" so the Runtime will only allow the input of a number value to this field. The name of the field is "return_months" and the label for the field is "Return to clinic in how many months". When the page is first displayed, this field will be the one in focus.

```
{"avInputTable":{
        "avK":"investigationstable",
        "av%":"49%",
        "avMR":"2%",
        "widgets":[
```

Directive which tells the runtime to display the following widgets across only 49% of the screen, with a 2% margin on the right, if that is appropriate for the device (the runtime makes the final decision). This grouping is called "investigationstable". The following several directives are in the widgets array and will be contained within this table.

{"avInputField":{"avInput":"title", "avL":"Investigations"}},

Directive to define a title for display at this point in the form.

{"avSetCheckBox": { "avN":"cardio", "avL":"Cardiopulmonary study"} },

Directive to define a check box in the form. The value will be true or false, and the appearance of the checkbox will be determined by the runtime in a way appropriate for the device. The name of the field is "cardio" and the label for the field is "Cardiopulmonary study".

{"avSetCheckBox": { "avN":"blood", "avL":"Bloodwork"} },

Similarly, a check box with the name "blood" and the label "Bloodwork".

```
{"avSetTagList":{
        "avO":{
            "cbc":       "cbc",
            "lytes":     "lytes",
            "cr":        "Cr",
            "bun":       "BUN",
            "crp":       "CRP",
            "tchol":     "Tchol",
            "troponin":  "troponin"
        },
        "avConditionalDisplay":{"istrue":"blood"},
        "avL":"Bloodwork Orders",
        "avN":"bloodwork",
```

```
        "avEmpty":"Select Bloodwork
Orders",
        "avMlt":true
    }    },
```

This tag list has six options and does not request its tags from the Web server. Any number of tags may be selected at one time. The runtime will only display this list if the value of the "blood" check box is true.

```
            {}
        ]
    }
},
```

End of the avInputTable definition.

```
{"avInputTable":{
        "avK":"referralstable",
        "av%":"49%",
        "widgets":[
```

Directive which tells the Runtime to display the following widgets across only 49% of the screen, if that is appropriate for the device (the runtime makes the final decision). If, for example, the device is barely wide enough to display this table by itself, it will be given 100% of the width of the screen. This grouping is called "referralstable". The following several directives are in the widgets array and will be contained within this table.

```
{"avSetCheckBox":{
        "avN":"rehab",
        "avL":"Cardiac rehabilitation"
}},
```

A check box with the name "rehab" and the label "Cardiac rehabilitation".

```
{"avInputField":{
        "avInput":"text",
        "avN":"rehab_site",
"avConditionalDisplay":{"istrue":"rehab"},
        "avL":"Rehabilitation Location"
    }    },
```

Directive to define an input field of type "text" named "rehab site" and label "Rehabilitation location". This field will only be displayed if the value of the "rehab" check box is true.

```
            {}
        ]
    }
}
```

End of the avInputTable definition.
],
End of the form description array.

An example of a recipe object which is a definition array for a date widget will now be described. This array of objects will help the runtime create a virtual keyboard based on these label:key value pairs. For example, the key labelled "3" will submit key code 51 when clicked.

```
"avYearWidget":[
    {"-":109},
    {"This Year":190},
    {"+":107},
    {"1":49},
    {"2":50},
    {"3":51},
    {"4":52},
    {"5":53},
    {"6":54},
    {"7":55},
    {"8":56},
    {"9":57},
    {"<prev":1009},
    {"0":48},
    {"next>":9},
    {" ":0},
    {"Today":32},
    {" ":0},
    {}
]
```

Another type of recipe object which is a theme setter will be described. The runtime will parse this directive and set up CSS styles in a theme suitable for the specific product. This dynamic alteration of CSS is used in several circumstances in the runtime to boost performance and ease interaction.

```
"avTheme":{
    "av-chrome":"color:#ffffff; stroke:#ffffff; fill:#ffffff;
            background-color:#e75300",
    "av-datum":    "color:#000000; stroke:#e75300;
fill:#e75300;
            background-color:#FFFFFF",
    "av-ctrl": "color:#e75300; stroke:#e75300; fill:#e75300;
            background-color:#faddcc",
    "av-filter":"color:#e75300; stroke:#e75300; fill:#e75300;
            background-color:#FFFFFF; border:solid 1px
#e75300;
            border-radius:5px",
    "av-hover":    "color:#000000; stroke:#000000;
fill:#000000;
            background-color:#e7d4e9",
    "av-touch-active": "color:#000000 !important;
            stroke:#000000 !important; fill:#000000
!important;
            background-color:#faddcc !important",
    "av-column-separator":"background-image:
            linear-gradient(270deg, #e75300, #e75300 10%,
transparent 10%);"
}
```

The above examples may help illustrate how the runtime combines the influences of recipe (business logic), device capabilities, and system state (data content) to present the best appropriate representation at any time.

Exemplary Dictionary of Keys for Use in Recipe Files.

Keys are constants that define directives, parameters for directives, or input fields.

A primary key is a directive which causes the interpreter to take some action. A supplementary key is a parameter which tailors the activity.

To give one specific example, in structured JSON format:

```
{"avSetListView":{
"avTgt":"av-client-list",
"avId":"av-client-list-view",
"avDomain":"TXN",
"avAction":"fetch",
```

-continued

```
"avPlaceholder":"Search transactions",
"avM":"Loading Transactions...",
"avP":"av-txn-list"
}
},
```

"avSetListView" is the directive which is executed by the runtime, while avTgt, avid, avDomain, avAction, avPlaceholder, avM, and avP are parameters (i.e. supplementary keys) for this particular instantiation of the directive.

Examples of primary keys for different types of directives recognised by the runtime:

| | |
|---|---|
| avAddItemToActionSheet | add an (actionable) item to an action sheet |
| avCheckCache | check now to see whether the application cache has changed |
| avCreateActionSheet | declare an action sheet |
| avInputField | declare a field in a form; one of many types below |
| avPieChart | declare a pie chart |
| avRevealActionSheet | make an action sheet active, obscuring the page behind |
| avRevealPage | make a page active |
| avSetCheckBox | declare a checkbox (true/false value) |
| avSetDashBar | declare a dashboard bar (right side of the page) |
| avSetFixedView | declare a fixed, static view |
| avSetForm | declare a form to hold data fields |
| avSetListView | declare a list view |
| avSetMapView | declare a map view |
| avSetNavBar | declare a navigation bar (top of the page) |
| avSetNavEscape | declare an escape (go back) button |
| avSetNavTitle | declare a navigation title |
| avSetPage | declare a page |
| avSetRadioButtons | declare a set of radio buttons (multiple, selectable) |
| avSetSideBar | declare a side bar (left side of the page) |
| avSetTab | declare a tab button |
| avSetTabBar | declare a tab bar (bottom of the page) |
| avSetTagList | declare a tag list |
| avSetTool | declare a navigation button |

Examples of parameter keys used by directives:

| | |
|---|---|
| avAS | subject to use to assist completion of the field in context |
| avAssist | other fields to use to assist completion of the field in context |
| avB | in a list specification, the general role in a block of data |
| avC | command (behaviour) |
| avD | direction to use in transitions |
| avDashBarItems | array of widgets to include in the dashboard bar |
| avDate | in a list filter, specify a date field |
| avDW | default width for a list field |
| avDropTarget | if appropriate for the device, designate this DOM element as a drop target |
| avEmpty | message to display when no records are found or selected |
| avF | name of form to use when seeking data fields |
| avFF | name of form specification to use when building a form |
| avHex | hexadecimal colour value |
| avI | icon - SVG or PNG file to use as graphic icon |
| avId | DOM id specified |
| avIS | subject to use in a query for an insert (new data record) |
| avK | key to use in query or DOM |
| avL | label for the widget |
| avM | message to use, usually when loading |
| avMlt | allow multiple choices (e.g. files or tags) |
| avN | DOM name for a form field (form name, not ID) |
| avO/avOpts | Options to use (e.g. for tag list or radio buttons) |
| avOnComplete | subject to submit when action (e.g. download) is completed |
| avP | page to navigate toward when activated |
| avPlaceholder | placeholder for a DOM data field |
| avQuery | parameters to use in a query |
| avRef | name of field to fetch reference data from when submitting a request |
| avRO | set widget as Read Only |
| avS | subject to use in a query |
| avSetFocus | if appropriate for the device, set initial focus on this field |
| avSideBarItems | array of widgets to include in the side bar |
| avSym | symbol to associate with a tag |
| avTgt | target in the DOM into which to insert this widget |
| avUnique | ensure tag is unique in the tag list |
| avUS | subject to use in a query for an update (altered data record) |
| av % | percentage of page width to occupy if appropriate for device |

Examples of types of input fields:

| | |
|---|---|
| avdate | date format |
| calc | field value to be calculated based on other fields |
| ccy | multi currency field |
| dbref | database reference, with visible label and hidden key |
| email | email address |
| imagefile | SVG or PNG file |
| ltext | multilingual text field, left-aligned |
| name | multi-character-set name field |
| number | number field |
| password | password field |
| plaintext | simple, monolingual text field |
| tel | telephone number field |
| text | multilingual text field |
| title | large, bold static title |
| url | URL field |

A potential advantage of some embodiments of the present invention is that complex and rich user interaction can be provided using the runtime interpreter whilst reducing latency and mitigating against unreliable communications connections. Furthermore, development of web applications is simplified.

Other potential advantages of some embodiment of the present invention are outlined in the table below:

| Possible Embodiment Feature | Potential Advantages |
|---|---|
| Keeping the recipe (sequence) local to the client, controlled by the JS runtime | The JS runtime can detect the capabilities of its browser host and configure its own widgets to take advantage of the specific device. For example, but not limited to: screen size, graphic capability, touch gestures, geolocation, mouse movements and keyboard access. |
| | Less bandwidth used between client and web server |
| | Avoidance of high-latency communication between client and server, resulting in improved responsiveness on the client. |
| Containing the business logic entirely within the recipe, removing it from the runtime | New applications can be written by a business analyst with some familiarity in the features available to recipes; a web developer is not required. |
| | New applications are faster to develop because debugging is limited to business logic flows and interactions. |

| Possible Embodiment Feature | Potential Advantages |
| --- | --- |
| Containing all system instructions within the runtime, separating it completely from the business logic in the recipe | The runtime can be optimised for maximum performance within a browser, and this optimisation is then used to the advantage of any recipe running within the runtime. Easy extension of application business logic to new classes of devices (e.g. hand held, wearable, desktop) |
| Replacing HTML in the server/client communications with direct DOM manipulation | Elimination of the costly need for the browser to parse HTML Greater control over browser painting sequences Better animation performance by intelligently selecting timing for screen update and refresh |
| Storing program state on the client | Improved user experience on warm start, resuming where last left off Reduced communication with the web server through the use of cached data |
| Storing program state on the client | Improved user experience on warm start, resuming where last left off Reduced communication with the web server through the use of cached data content |
| Domain and action based routing in the message | Specific subjects/domains and associated data requirements can be specified in the recipe. There is no one-to-one link between the Client request and the View servers ready to respond to the request. The servers can be scaled out practically |

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departure from the spirit or scope of applicant's general inventive concept.

The invention claimed is:

1. A computer-implemented method for executing instructions within a browser on a device, including:
   receiving a boot-strap web page at the browser, wherein the boot-strap web page includes a reference to a runtime interpreter on a first server and wherein the runtime interpreter is configured to execute a plurality of instruction sets at a plurality of different device hardware configurations;
   determining whether the runtime interpreter is stored at the device;
   retrieving the runtime interpreter from the first server and storing the retrieved runtime interpreter within a local cache at the browser when the runtime interpreter is determined not to be stored at the device;
   retrieving the runtime interpreter from the local cache at the browser when the runtime interpreter is determined to be stored at the device;
   receiving the runtime interpreter from either the first server or the local cache at the browser executing on the device;
   receiving, from a second server, one of a plurality of instruction sets at the device;
   executing the received runtime interpreter within the browser; and
   the received runtime interpreter executing the received instruction set in accordance with a determined hardware configuration of the device.

2. A method as claimed in claim 1, wherein the runtime interpreter is, at least in part, defined within JavaScript.

3. A method as claimed in claim 2, wherein the runtime interpreter is, at least in part, defined within Cascading Style Sheet (CSS) format.

4. A method as claimed in claim 1, wherein the runtime interpreter executes the received instruction set in accordance with device-specific modifications.

5. A method as claimed in claim 1, wherein each instruction set is comprised of a plurality of objects.

6. A method as claimed in claim 5, wherein each object comprises a directive and set of supporting data.

7. A method as claimed in claim 6, wherein at least some objects define modification to the document object model displayed by the browser.

8. A method as claimed in claim 5, wherein each object defines a target state.

9. A method as claimed in claim 5, wherein the plurality of objects define a hierarchical relationship between them.

10. A method as claimed in claim 1, wherein the received instruction set defines one or more external requests.

11. A method as claimed in claim 10, wherein each request includes a domain and an action.

12. A method as claimed in claim 10, wherein each request is delivered to a web server.

13. A method as claimed in claim 10, wherein each request includes a data payload.

14. A method as claimed in claim 1, wherein the runtime interpreter is configured to execute on a plurality of device types.

15. A method as claimed in claim 1, wherein the runtime interpreter is configured to execute within a plurality of environment types.

16. A method as claimed in claim 1, wherein the instruction set is defined within a structured format.

17. A method as claimed in claim 16, wherein the structured format is subject-based.

18. A method as claimed in claim 16, wherein the structured format is comprised of attribute-value pairs.

19. A method as claimed in claim 1, wherein the instruction set is defined within a structured format.

20. A method as claimed in claim 19, wherein the structured format is subject-based.

21. A method as claimed in claim 1, further including further including the received runtime interpreter detecting a change in the hardware configuration for the device and the received runtime interpreter executing the received instruction set in accordance with the detected change in the hardware configuration.

22. A method as claimed in claim 1, wherein the boot-strap web page is configured to load a plurality of parameters including tag information for the device, a link to the local storage at the device, and a link to the runtime interpreter.

23. A method as claimed in claim 1, wherein each instruction set is comprised of a plurality of objects and one or more of the objects define modifications to a Document Object Model represented and displayed by the browser.

24. A method as claimed in claim 1, wherein the runtime interpreter is configured to keep track of a program state by storing state information in a Document Object Model represented and displayed by the browser.

25. A method as claimed in claim 1, wherein the runtime interpreter is configured to determine hardware and operating system capabilities of the device and the received runtime interpreter executes the received instruction set in accordance with the determined hardware and operating system capabilities.

26. A system for deploying semi-autonomous web applications, including:
- a first web server configured to deliver a runtime interpreter to a browser executing on a user device;
- a second web server configured to deliver one of a plurality of instructions sets to a browser executing on a user device; and p1 a plurality of user devices, each device including a computer system configured to control the user device to:
  - receive a boot-strap web page at the browser executing on the device, wherein the boot-strap web page includes a reference to the runtime interpreter on the first web server and
  - wherein the runtime interpreter is configured to execute a plurality of instruction sets at a plurality of different device hardware configurations;
  - determine whether the runtime interpreter is stored at the device;
  - retrieve the runtime interpreter from the first web server and store the retrieved runtime interpreter within a local cache at the browser when the runtime interpreter is determined not to be stored at the device;
  - retrieve the runtime interpreter from the local cache at the browser when the runtime interpreter is determined to be stored at the device;
  - receive the runtime interpreter from either the first web server or the local cache at the browser executing on the device;
  - receive, from the second web server, one of the plurality of instruction sets;
  - execute the received runtime interpreter within the browser; and
  - execute the received instruction set within the executing runtime interpreter in accordance with a determined hardware configuration of the device.

27. A non-transitory computer readable medium configured for storing a processing program executable by a computer system in a device, the processing program, when executed, causing the computer system to perform functionality comprising:
- receiving a boot-strap web page at a browser executing on the device, wherein the boot-strap web page includes a reference to a runtime interpreter on a first server and
- wherein the runtime interpreter is configured to execute a plurality of instruction sets at a plurality of different device hardware configurations;
- determining whether the runtime interpreter is stored at the device;
- retrieving the runtime interpreter from the first server and storing the retrieved runtime interpreter within a local cache at the browser when the runtime interpreter is determined not to be stored at the device;
- retrieving the runtime interpreter from the local cache at the browser when the runtime interpreter is determined to be stored at the device;
- receiving the runtime interpreter from either the first server or the local cache at the browser local ctorage at a browccr executing on the device;
- receiving, from a second server, one of a plurality of instruction sets at the device;
- executing the received runtime interpreter within the browser; and
- the received runtime interpreter executing the received instruction set in accordance with a determined hardware configuration of the device.

* * * * *